United States Patent
Takanohashi (10) Patent No.: US 6,484,493 B2
(45) Date of Patent: Nov. 26, 2002

(54) EXHAUST EMISSION CONTROL DEVICE FOR INTERNAL COMBUSTION ENGINE

(75) Inventor: Toshikatsu Takanohashi, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/578,909

(22) Filed: May 26, 2000

(65) Prior Publication Data

US 2002/0053198 A1 May 9, 2002

(30) Foreign Application Priority Data

Jun. 3, 1999 (JP) .......................................... 11-157148
Sep. 7, 1999 (JP) .......................................... 11-253652

(51) Int. Cl.$^7$ ................................................ F01N 3/00
(52) U.S. Cl. .............................. 60/277; 60/276; 60/285
(58) Field of Search ........................ 60/274, 276, 277, 60/285, 295, 301; 502/346

(56) References Cited

U.S. PATENT DOCUMENTS

| 5,325,664 A | * | 7/1994 | Seki et al. ...................... 60/277 |
| 5,402,641 A | * | 4/1995 | Katoh et al. ................... 60/285 |
| 5,644,912 A | * | 7/1997 | Kawamura .................... 60/276 |
| 5,655,363 A | * | 8/1997 | Ito et al. ......................... 60/276 |
| 5,713,199 A | * | 2/1998 | Takeshima et al. ............ 60/277 |
| 5,724,808 A | * | 3/1998 | Ito et al. ......................... 60/277 |
| 5,743,084 A | * | 4/1998 | Hepburn ........................ 60/274 |
| 5,771,685 A | * | 6/1998 | Hepburn ........................ 60/277 |
| 5,834,395 A | * | 11/1998 | Honda ......................... 502/346 |
| 5,887,421 A | * | 3/1999 | Mitsutani ..................... 60/277 |
| 6,138,453 A | * | 10/2000 | Sawada et al. ............... 60/277 |
| 6,161,428 A | * | 12/2000 | Esteghlal et al. ............. 60/277 |
| 6,216,449 B1 | * | 4/2001 | Strehlau et al. .............. 60/274 |

* cited by examiner

Primary Examiner—Thomas Denion
Assistant Examiner—Tu M. Nguyen
(74) Attorney, Agent, or Firm—Arent Fox Kintner Plotkin & Kahn (57) ABSTRACT

An object of the invention is to reliably judge if a $NO_X$ absorbent has deteriorated due to sulfur poisoning, or has heat deteriorated. At the time of executing rich spiking, a sulfur poisoning stoichiometric conversion time threshold value tm: LMT-S deterioration, for judging if a $NO_X$ absorbent has been sulfur poisoned, and a heat deterioration stoichiometric conversion time threshold value tm: LMT heat deterioration, for judging if the $NO_X$ absorbent has heat deteriorated to an extent that the $NO_X$ absorption capacity has been lost, are set in relation to the time (stoichiometric conversion time) taken for an output signal from a second $O_2$ sensor to change from lean to rich. When a measurement value of the stoichiometric conversion time is shorter than the heat deterioration stoichiometric conversion time threshold value tm: LMT heat deterioration, it is judged that the $NO_X$ absorbent has completely heat deteriorated, and when this is longer than the heat deterioration stoichiometric conversion time threshold value tm: LMT heat deterioration, and shorter than the sulfur poisoning stoichiometric conversion time threshold value tm: LMT-S deterioration, it is judged that there is sulfur poisoning.

5 Claims, 5 Drawing Sheets

EXHAUST EMISSION CONTROL DEVICE FOR INTERNAL COMBUSTION ENGINE

BACKGROUND OF THE INVENTION

1. Field of the Invention

The present invention relates to an exhaust emission control device for an internal combustion engine, and in particular relates to an exhaust emission control device for an internal combustion engine for reducing and purifying nitrogen oxides contained in the exhaust gas.

2. Description of the Related Art

Conventionally, the air-fuel ratio of the mixture supplied to an internal combustion engine is set leaner than the stoichiometric air-fuel ratio, however when a so-called lean-burn control is performed there is a tendency for the discharge amount of nitrogen oxides ($NO_X$) to increase. To address this there is known a technique for carrying out exhaust gas purification, by providing an exhaust emission control device incorporating a $NO_X$ absorbent for absorbing, or adsorbing, and removing $NO_X$ from the exhaust gas in the exhaust system of an internal combustion engine.

This $NO_X$ absorbent absorbs $NO_X$ in a condition where the air-fuel ratio of the exhaust gas is set to leaner than the stoichiometric air-fuel ratio so that the oxygen concentration in the exhaust gas is relatively high, and conversely reduces and purifies the absorbed $NO_X$ and expels it in the form of nitrogen gas ($N_2$) in a condition where the air-fuel ratio is set to richer than the stoichiometric air-fuel ratio so that the oxygen concentration in the exhaust gas is low and there is an abundance of hydrocarbons and carbon monoxide and the like.

However, when $NO_X$ accumulates in the $NO_X$ absorbent the $NO_X$ absorption capacity thereof is reduced so that the purifying efficiency with respect to the exhaust gas is reduced. Therefore, it is necessary to desorb the $NO_X$ absorbed by the $NO_X$ absorbent at an appropriate timing. In this case there is known a technique for carrying out regeneration of the $NO_X$ absorbent by performing so-called rich-spiking which involves; temporarily setting the airfuel ratio of the exhaust gas flowing into the $NO_X$ absorbent richer than the stoichiometric air-fuel ratio to thereby desorb the $NO_X$ which has been absorbed in the $NO_X$ absorbent, and to reduce and purify the desorbed $NO_X$ by means of the hydrocarbons and carbon monoxide and the like contained in the rich atmosphere of the exhaust gas.

Here, it is known that in the case where the air-fuel ratio of the exhaust gas flowing into the $NO_X$ absorbent is set to richer than the stoichiometric air-fuel ratio, then while the $NO_X$ is being desorbed from the $NO_X$ absorbent, the air-fuel ratio of the exhaust gas discharged from the $NO_X$ absorbent becomes, if only slightly, leaner than the stoichiometric air-fuel ratio, and after this when the desorption of the $NO_X$ from the $NO_X$ absorbent is completed, the air-fuel ratio of the exhaust gas becomes richer than the stoichiometric air-fuel ratio. In this case, the smaller the amount of $NO_X$ absorbed in the $NO_X$ absorbent, the shorter the time taken after implementation of rich-spiking for the air-fuel ratio of the exhaust gas discharged from the $NO_X$ absorbent to change to richer than the stoichiometric air-fuel ratio . Therefore, for example as disclosed for example in PCT International Publication WO 94/17291, there is known an exhaust emission control device for an internal combustion engine which judges the degree of deterioration of the $NO_X$ absorbent, from the time taken after the implementation of rich-spiking for the exhaust gas discharged from the $NO_X$ absorbent to change to a rich atmosphere.

Furthermore, because sulfur is contained in fuel and lubricants for internal combustion engines, sulfur compounds such as sulfur oxides (SOx) are present in the exhaust gases. $NO_X$ absorbents such as those mentioned above also absorb sulfur compounds in addition to $NO_X$. Here, the sulfur compounds absorbed by $NO_X$ absorbents have the propensity to accumulate more easily compared to $NO_X$, and with an increase in the accumulated amount of sulfur compounds the absorption of $NO_X$ is hindered. Hence the purifying efficiency of $NO_X$ is gradually reduced and a deterioration of the $NO_X$ absorbent occurs due to so-called poisoning.

In the case where poisoning of the $NO_X$ absorbent occurs in this way, there is known a method for recovering such poisoning by removing sulfur compounds absorbed by the $NO_X$ absorbent by heating the $NO_X$ absorbent to an appropriate high temperature and setting the air-fuel ratio of the exhaust gas to richer than the stoichiometric air-fuel ratio and maintaining these condition for an appropriate period of time. As such an exhaust emission control device for an internal combustion engine, there is known an exhaust emission control device for an internal combustion engine as disclosed in Japan Unexamined Patent Application, First Publication No. Hei 7-186785, which performs the reduction and removal of sulfur compounds absorbed by the $NO_X$ absorbent when an estimated amount of sulfur compounds absorbed by the $NO_X$ absorbent exceeds a predetermined value, by controlling the temperature of the exhaust gas by controlling the transmission stage of an automatic transmission connected to the internal combustion engine, and setting the air-fuel ratio of the internal combustion engine to richer than the stoichiometric air-fuel ratio.

However, with the exhaust emission control device for an internal combustion engine according to the above-mentioned conventional technology, the amount of sulfur compounds absorbed by the $NO_X$ absorbents is estimated on the basis of the operating conditions of the internal combustion engine.

However, for the data considered necessary at the time of estimating the amount of these sulfur compounds, it is impossible to accurately know the amount of sulfur already contained in the fuel supplied to an internal combustion engine. Hence the problem arises in that the sulfur concentration within the $NO_X$ absorbent cannot be specified.

Moreover, even if the amount of sulfur compounds within the $NO_X$ absorbent are constant, since due to the temperature and the like of the $NO_X$ absorbent, the amount of sulfur compounds actually absorbed changes, there is a problem in that it is not possible to accurately judge the degree of deterioration of the $NO_X$ absorbent due to sulfur poisoning.

SUMMARY OF THE INVENTION

The present invention takes into consideration the above-mentioned situations with the object of providing an exhaust emission control device for an internal combustion engine which is able to accurately judge, by employing a simple method, whether the $NO_X$ absorption capacity of the $NO_X$ absorbent has deteriorated or not due to sulfur poisoning of the $NO_X$ absorbent.

In order to attain the object related to solving the above problem, the exhaust emission control device for an internal combustion engine according to the present invention which includes a nitrogen oxides purification device (the $NO_X$ absorbent 26 in the later described embodiment) provided in an exhaust system of an internal combustion engine for absorbing nitrogen oxides when an air-fuel ratio of exhaust gas is leaner than a stoichiometric air-fuel ratio, and reducing the nitrogen oxides when richer, comprising: an oxygen concentration measurement device (the second $O_2$ sensor 24 in the later described embodiment) provided downstream from said nitrogen oxides purification device for measuring oxygen concentration in said exhaust gas; a time measurement device (the step S7 and step S8 in the later described embodiment) for measuring the time taken for an output signal from said oxygen concentration measurement device to change from lean to rich, when the air-fuel ratio of the mixture supplied to said internal combustion engine changes from a condition leaner than the stoichiometric air-fuel ratio to a richer condition; a threshold value setting device (the step S17 in the later described embodiment) for setting in relation to said time, a predetermined first threshold value (the sulfur poisoning stoichiometric conversion time threshold value tm: LMT-S deterioration, in the later described embodiment) for judging if a purifying capacity of said nitrogen oxides purification device has deteriorated due to sulfur poisoning; and a predetermined second threshold value (the heat deterioration stoichiometric conversion time threshold value tm: LMT heat deterioration, in the later described embodiment) shorter than said first threshold value for judging if said nitrogen oxides purification device has heat deteriorated; and a deterioration judging device (step S19 to step S22, in later described embodiment) for judging that said nitrogen oxides purification device has deteriorated due to sulfur poisoning when a measured time of said time measurement device is shorter than said first threshold value and longer than said second threshold value, and for judging that said nitrogen oxides purification device has heat deteriorated when the measured time is shorter than said second threshold value.

With the exhaust emission control device for an internal combustion engine of the above construction, in relation to the time (stoichiometric conversion time) taken for an output signal from the oxygen concentration measurement device to change from lean to rich when the air-fuel ratio of the mixture supplied to the internal combustion engine changes from a condition leaner than the stoichiometric air-fuel ratio to a richer condition, the measurement of the stoichiometric conversion time is carried out with respect to for example the nitrogen oxides purification device already poisoned by sulfur and the nitrogen oxides purification device which has heat deteriorated. Then based on these data, by setting the first threshold value for judging if due to sulfur poisoning the nitrogen oxides purification device has deteriorated to the extent that it is recoverable, and the second threshold value for judging if due to heat deterioration and the like the nitrogen oxides purification device has been irreversibly heat deteriorated to the extent that the $NO_X$ absorption capacity has been lost, it is possible to accurately distinguish between whether a nitrogen oxides purification device has heat deteriorated to an extent that the $NO_X$ absorption capacity has been lost and is thus unrecoverable, or whether it is in a temporary sulfur-deteriorated condition which is recoverable.

Furthermore, an exhaust emission control device for an internal combustion engine according to a second aspect provided a sulfur deterioration regeneration device (step S23, in the later described embodiment) for recovering sulfur poisoning of said nitrogen oxides purification device, when judged by said deterioration judging device that said nitrogen oxides purification device has deteriorated due to sulfur poisoning.

With the exhaust emission control device for an internal combustion engine of the above construction, it is possible to reliably judge if the nitrogen oxides purification device is in a temporary sulfur-deteriorated condition which is recoverable. Therefore, it is possible, with appropriate timing, to recover sulfur poisoning by means of the sulfur deterioration regeneration device, before deterioration of the nitrogen oxides purification device due to sulfur poisoning progresses. In addition, a lowering in purifying efficiency with respect to the exhaust gas can be suppressed. Furthermore, because implementation of anything over and above what is needed for implementing the processing for recovering the sulfur poisoning is prevented, it is possible to contribute to the preventing a worsening in the fuel consumption of the internal combustion engine.

DESCRIPTION OF THE PREFERRED EMBODIMENTS

A first embodiment of an exhaust emission control device for an internal combustion engine of the present invention will be explained below with reference to the appended drawings.

Figure 1:
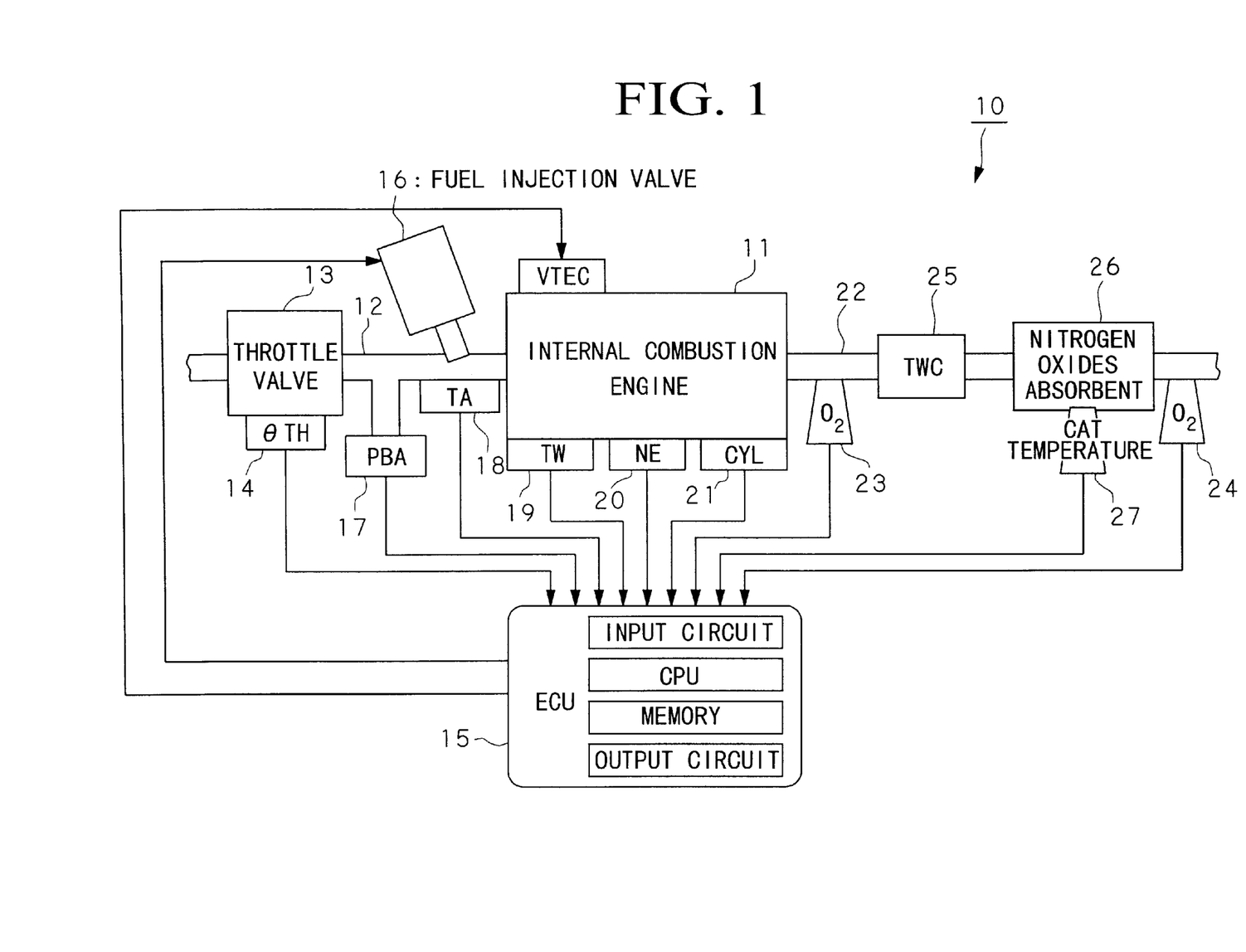
FIG. 1 is a block drawing of an exhaust emission control device for an internal combustion engine according to an embodiment of the present invention.

FIG. 1 is a block diagram of an exhaust emission control device 10 for an internal combustion engine according to the first embodiment of the present invention.

Firstly, an air-fuel ratio control device which is incorporated into the exhaust emission control device 10 for an internal combustion engine according to the embodiment of the present invention will be explained. With this air-fuel ratio control device, a throttle valve 13 is disposed in an air intake pipe 12 of an internal combustion engine such as a multi-cylinder engine or the like, and provided to this throttle valve 13 is a throttle valve opening (θTH) sensor 14. This (θTH) sensor 14 outputs an electrical signal in response to the opening of the throttle valve 13 which is supplied to an electronic control unit (ECU)15.

Furthermore, a fuel injection valve 16 is disposed between the internal combustion engine 11 and the throttle valve 13. The fuel injection valve 16, as well as being connected to a fuel pump (not shown in the figure) is connected electrically to the ECU 15, and an electrical signal from this ECU 15 controls the fuel injection time, in other words, the opening time of the fuel injection valve 16.

Downstream (on the internal combustion engine 11 side) of the throttle valve 13 within the air intake pipe 12 there is disposed an intake pipe absolute pressure (PBA) sensor 17. The PBA sensor 17 converts the absolute pressure within the intake pipe 12 to an electrical signal and supplies this to the ECU 15. In addition, downstream of the PBA sensor 17 there is disposed an intake temperature (TA) sensor 18 which measures the intake air temperature and supplies a corresponding electrical signal to the ECU 15.

An engine water temperature (TW) sensor 19 provided on the internal combustion engine 11 comprises for example, a thermistor or the like, and measures the circulating water temperature of the internal combustion engine 11 and outputs a corresponding electrical signal to the ECU 15. Also, an engine speed (NE) sensor 20 and a cylinder judging (CYL) sensor 21 are attached in the vicinity of the cam shaft or crank shaft (not shown in the figure) of the internal combustion engine 11. In relation to the top dead center (TDC) at the time of commencement of the intake stroke for the various cylinders of the internal combustion engine 11, the NE sensor 20 outputs a TDC signal pulse at a predetermined crank angle position, for example in a four cylinder engine at every crank angle of 180°, and the CYL sensor 21 outputs a cylinder judging signal pulse at a predetermined crank angle position for a specified cylinder, and these respective signal pulses are supplied to the ECU 15.

Next, the exhaust emission control device 10 for an internal combustion engine according to the present embodiment will be explained. The exhaust emission control device 10 comprises; the ECU 15, an exhaust pipe 22, a first $O_2$ sensor 23, a second $O_2$ sensor 24, a catalyzer which purifies the constituents within the exhaust gas such as hydrocarbons, carbon monoxide, $NO_X$ and the like, for example a three-way catalyst (TWC) 25, a nitrogen oxides $NO_X$ absorbent 26, and a CAT temperature sensor 27.

The exhaust pipe 22 comprises an exhaust manifold section (not shown in the figure) connected to each cylinder of the internal combustion engine 11. Inside the exhaust pipe 22 are disposed, respectively, the first $O_2$ sensor 23 downstream of the internal combustion engine 11 and the second $O_2$ sensor 24 downstream of the $NO_X$ absorbent 26. The first and second sensors 23 and 24 are proportional type air fuel ratio (LAF) sensors comprising for example proportional type oxygen concentration detectors. These output electrical signals which are nearly proportional to the oxygen concentration within the exhaust gas and supply these to the ECU 15.

The $NO_X$ absorbent 26 is made up from a catalyst which comprises, for example, platinum Pt and the like. When the air fuel ratio of the exhaust gas is set to leaner than the stoichiometric air-fuel ratio, this absorbs the $NO_X$ inside the exhaust gas. When absorption is referred to below this either refers to the condition of absorption (or dispersal) within the catalyst, after for example the $NO_X$ has been converted to nitrate ions such as $NO_3^-$ and the like, or to the condition of the chemical absorption of for example the $NO_X$ on the surface of the catalyst.

Further, when the air-fuel ratio of the exhaust gas is set to richer than the stoichiometric ratio so that the oxygen concentration within the exhaust gas decreases, the $NO_X$ is reduced by the unburned hydrocarbons and carbon monoxide and the like which have increased in the exhaust gas, and is discharged as $N_2$. Also, the $NO_X$ absorbent 26 is provided with a CAT temperature sensor 27 for measuring the temperature of the catalyst (CAT). An electrical signal from the CAT temperature sensor 27 is supplied to the ECU 15.

Figure 2:
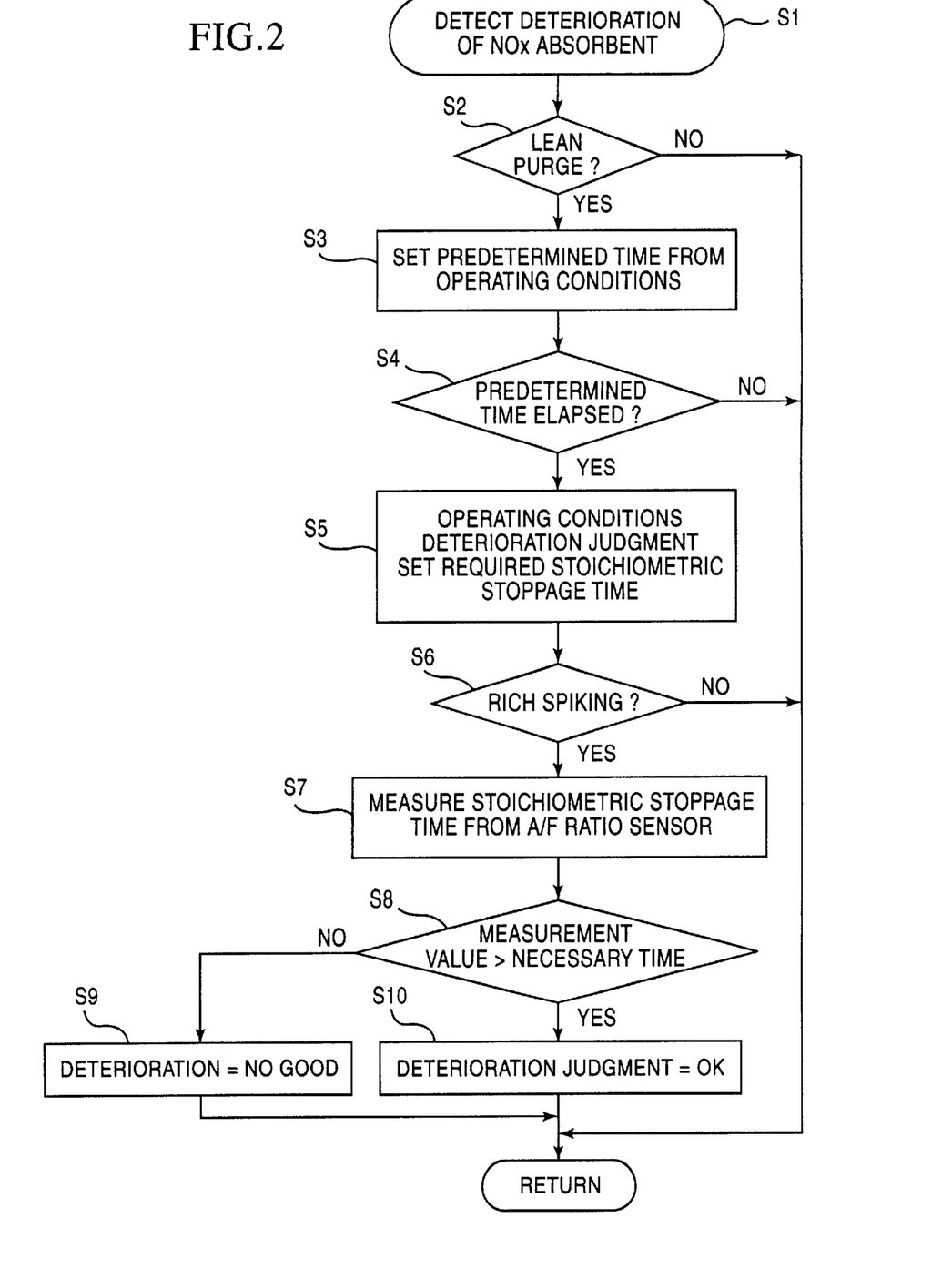
FIG. 2 is a flow chart showing the operation of the exhaust emission control device for an internal combustion engine shown in FIG. 1.
Figure 3:
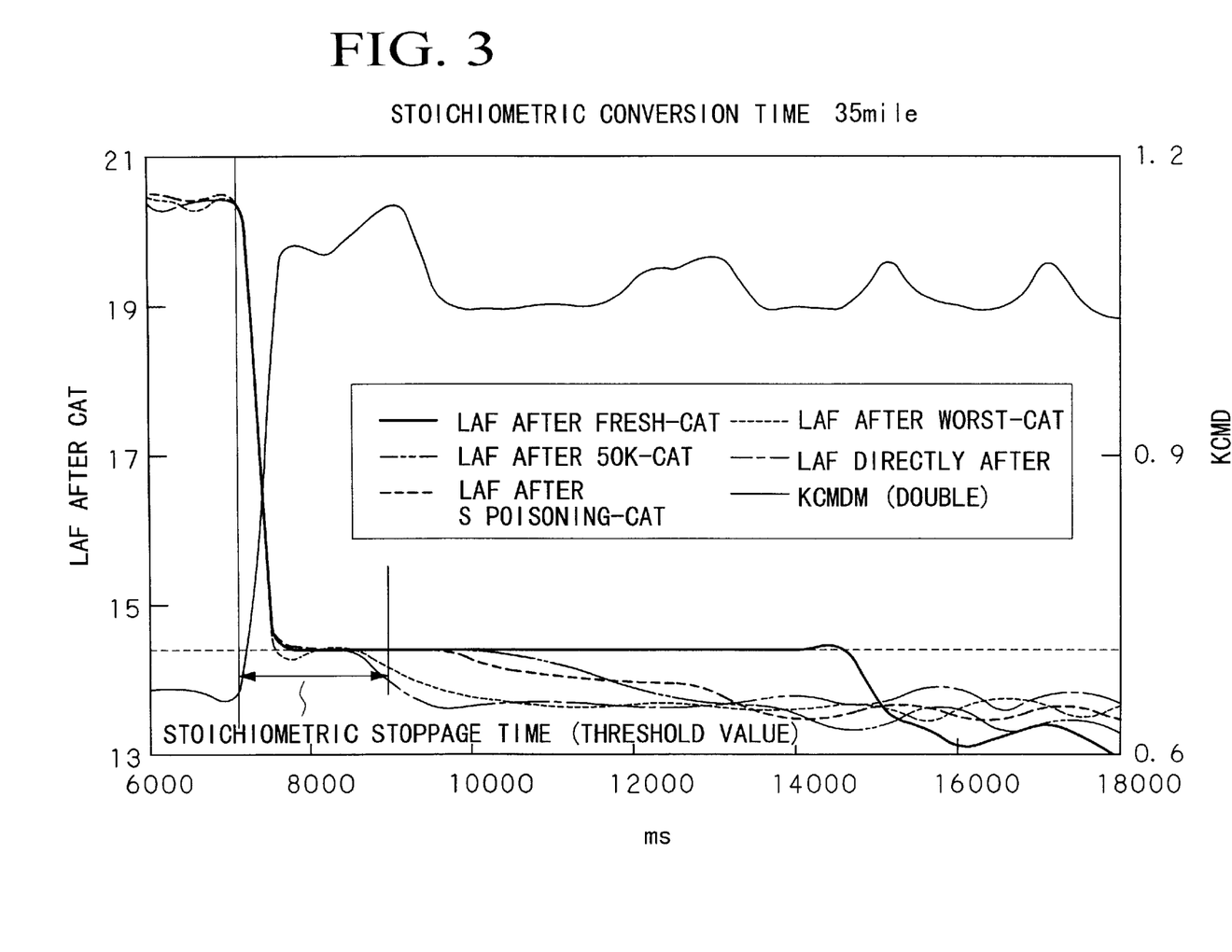
FIG. 3 is a diagram showing the outputs from first and second $O_2$ sensors when rich-spiking has been carried out in relation to the exhaust emission control device for an internal combustion engine shown in FIG. 1.

The exhaust emission control device 10 for an internal combustion engine according to the present embodiment incorporates the above-mentioned construction. As follows is an explanation of the operation of the exhaust emission control device 10 for an internal combustion engine, with reference to FIG. 1 through FIG. 3. FIG. 2 is a flow chart showing the operation of the exhaust emission control device 10 for an internal combustion engine shown in FIG. 1, and FIG. 3 is a diagram showing the output of the first and the second $O_2$ sensors 23 and 24 when rich-spiking is carried out for the exhaust emission control device 10 for an internal combustion engine shown in FIG. 1.

Firstly, when the process for detecting deterioration of the $NO_X$ absorbent 26 commences (Step S1), the air fuel ratio of the mixture supplied to the internal combustion engine 11 is set to leaner than the stoichiometric airfuel ratio, and it is judged whether or not lean burn control is being carried out (Step S2). In the case where the result of this judgement is "NO" the process is terminated.

However, in the case where the result of this judgement is "YES", a predetermined time for the engine to run under lean burn control is set based on the operating conditions for the internal combustion engine 11, for example, the output signals from the PBA sensor 17 and the NE sensor 20 (Step S3). This predetermined time is set shorter the more, for example, the internal combustion engine 11 is operating at a high rotation speed and a high load, and conversely, is set longer the more the engine is operating at a lower rotation speed and lower load. Then, it is judged whether or not this predetermined period of time has passed (Step S4), and in the case where the result of this judgement is "NO", the process is terminated.

On the other hand, in the case where the result of this judgement is "YES", the predetermined necessary time (threshold value level) relating to the stoichiometric conversion time is set taking into account the operating conditions of the internal combustion engine 11 (Step S5). Here, the stoichiometric conversion time is, for example as shown in FIG. 3, the period of time that it takes after the implementation of the rich-spiking for the air-fuel ratio of the exhaust gas discharged from the $NO_X$ absorbent 26 to reach the stoichiometric air-fuel ratio or a level just slightly leaner than the stoichiometric air-fuel ratio. This is equivalent to the time taken to carry out desorption of the $NO_X$ from the $NO_X$ absorbent 26.

In FIG. 3 is plotted values of output signals from the second $O_2$ sensor (LAF after CAT) 24 downstream from the $NO_X$ absorbent 26, converted to air-fuel ratios. The thick solid line (LAF after FRESH-CAT) represents a new $NO_X$ absorbent 26, the two dot dashed line (LAF after 50 K-CAT) represents the $NO_X$ absorbent 26 after it has been used over a running distance of 80,000 km, the short dashed line (LAF after S poisoning-CAI) represents the $NO_X$ absorbent 26 having been poisoned by the sulfur, and the dotted line (LAF after worst-CAT) shows the condition where the $NO_X$ absorbent 26 has deteriorated to the extent that the $NO_X$ absorption capacity has been lost. Also, the one dot dashed line (LAF directly after) shows the output signals from the first $O_2$ sensor 23 downstream from the internal combustion engine 11. Furthermore, the solid line (KCMD) is the target air-fuel ratio coefficient (KCMD) used for, for example, the control of the fuel injection valve 16, and is proportional to the inverse value of the air-fuel ratio (A/F), that is the fuel-air ratio (F/A), with a value 1.0 corresponding to the stoichiometric air-fuel ratio.

As shown in FIG. 3, the predetermined necessary time (threshold value level) relating to the stoichiometric conversion time, is set to a time interval between; the stoichiometric conversion time for the case where the $NO_X$ absorbent 26 has deteriorated due to heat deterioration and the like to the extent that the $NO_X$ absorption capacity has been lost, and the stoichiometric conversion time for the case where the $NO_X$ absorbent 26 has been poisoned by sulfur.

Next, as is shown in FIG. 2, as the process for judging the deterioration of the $NO_X$ absorbent 26, it is judged whether or not rich-spiking is being carried out (Step S6). In the case where the result of this judgement is "NO" the process is terminated. On the other hand, in the case where the result of this judgement is "YES", the measurement of the stoichiometric conversion time is carried out by means of the output signal from the second $O_2$ sensors downstream of the $NO_X$ absorbent 26 (Step 7).

Then, judging is carried out as to whether or not the measurement value f the stoichiometric conversion time has exceeded the predetermined necessary time (threshold value level) (Step S8). In the case where the result of this judgement is "NO" it is judged that the $NO_X$ absorbent 26 has deteriorated to the extent that the $NO_X$ absorption capacity has been lost (Step S9), and the process is terminated. On the other hand, in the case where the result of this judgement is "YES", it is judged that the $NO_X$ absorbent 26 has $NO_X$ absorption capacity (Step S10) and the process is terminated.

With the exhaust emission control device 10 for an internal combustion engine according to this embodiment, the predetermined necessary time (threshold value level) relating to the stoichiometric conversion time is set to a time interval between the stoichiometric conversion time for the case where the $NO_x$ absorbent 26 has deteriorated due to heat deterioration and the like to the extent that the $NO_x$ absorption capacity has been lost, and the stoichiometric conversion time for the case where the $NO_x$ absorbent 26 has been poisoned by sulfur. By merely judging at the time of executing rich spiking, whether or not the measurement value of the stoichiometric conversion time measured by the output signal from the second $O_2$ sensor 24 downstream from the $NO_x$ absorbent 26 has exceeded the predetermined necessary time (threshold value level), it is possible to judge both easily and accurately whether or not the $NO_x$ absorbent 26 has deteriorated to the extent that the $NO_x$ absorption capacity has been lost.

Figure 4:
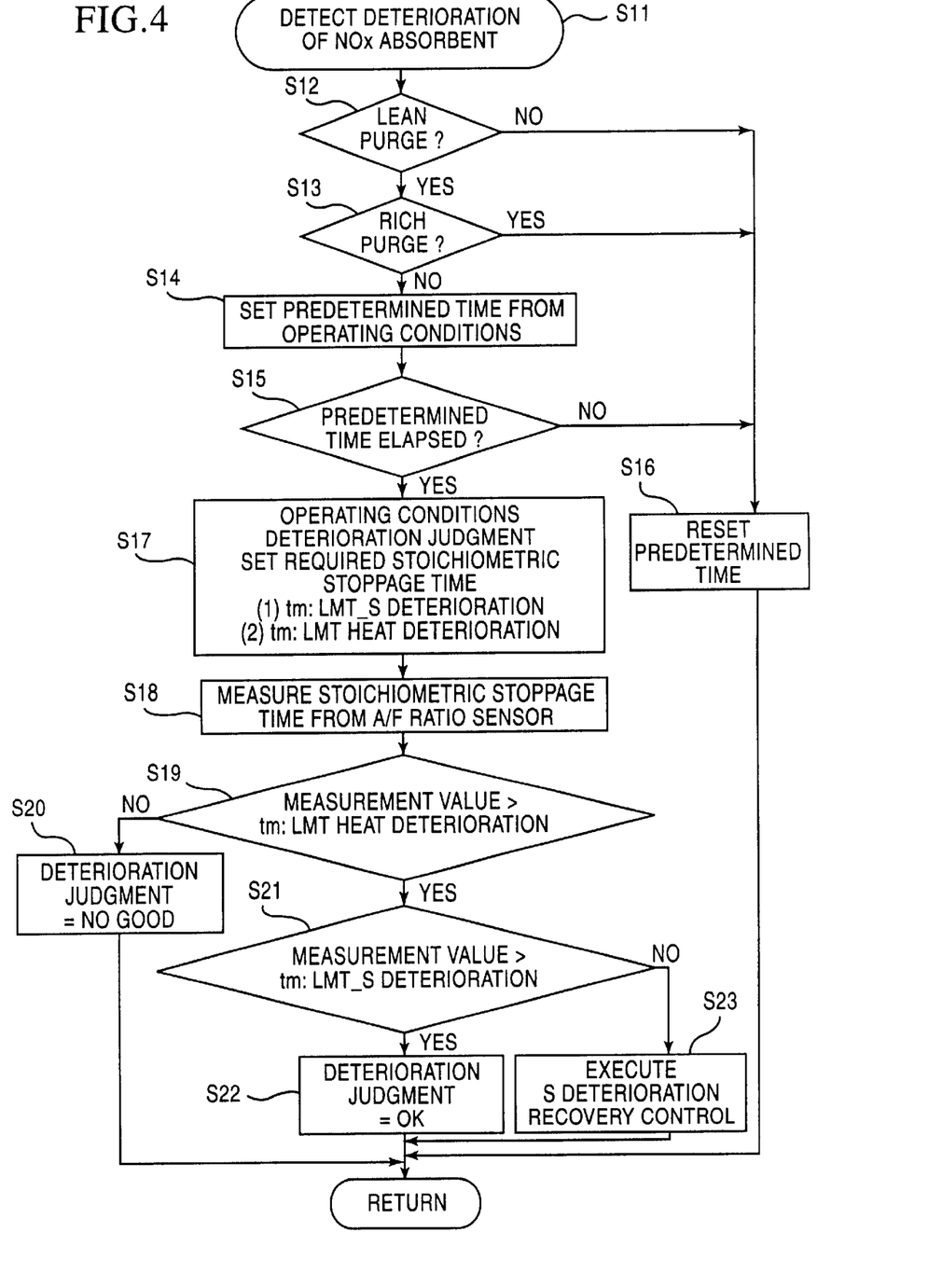
FIG. 4 is a flow chart showing the operation relating to a second embodiment of the present invention, which is an exhaust emission control device for the internal combustion engine shown in FIG. 1.
Figure 5:
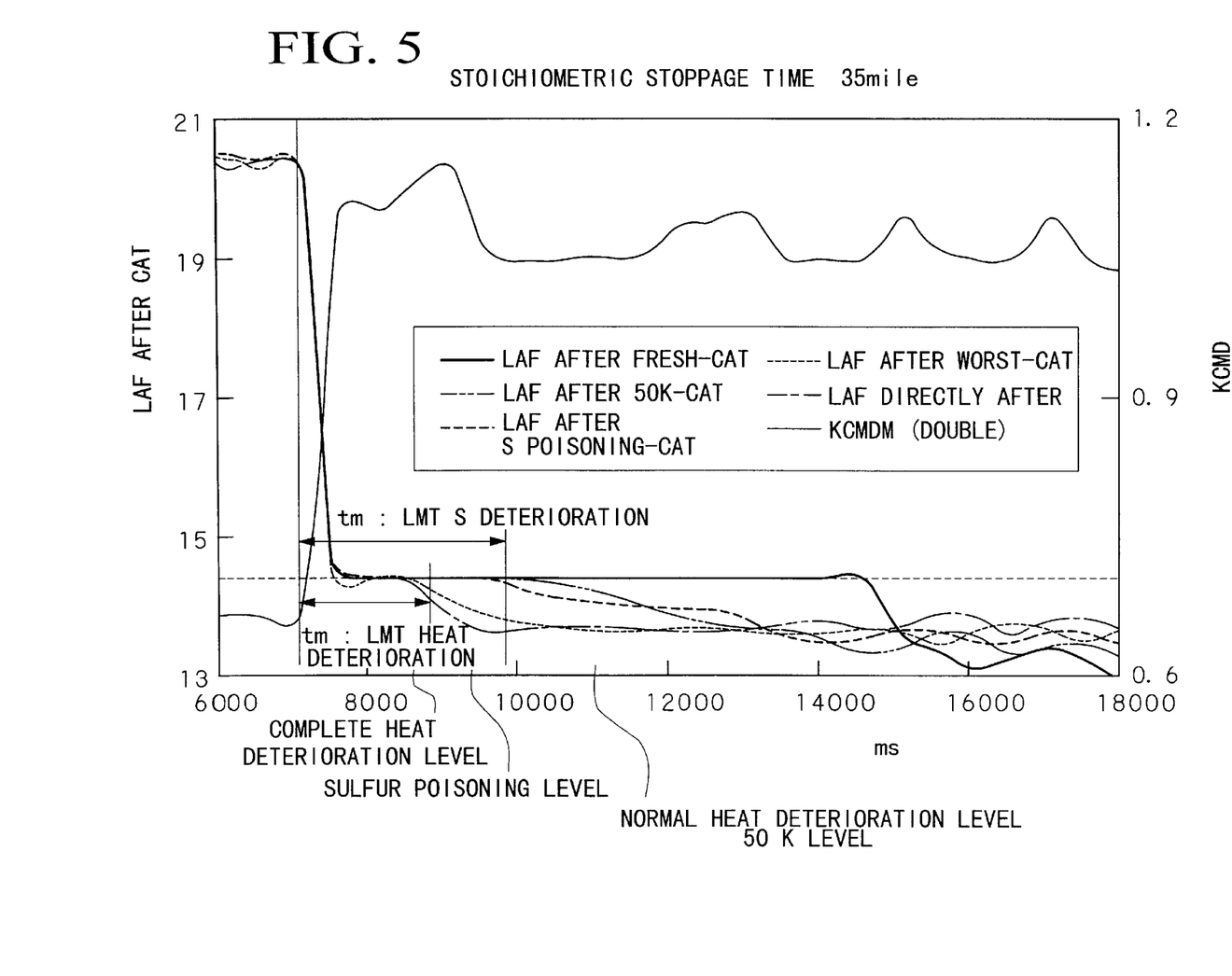
FIG. 5 is a diagram showing the relationships of the stoichiometric conversion times corresponding to the degree of deterioration of the $NO_X$ absorbent at the time when rich-spiking is being carried out according to the exhaust emission control device for the internal combustion engine shown in FIG. 1.

Next, a second embodiment of the exhaust emission control device for an internal combustion engine of the present invention will be explained with reference to the appended drawings. The exhaust emission control device 10 for an internal combustion engine according to this embodiment has the same construction as the exhaust emission control device 10 for an internal combustion engine according to the above-mentioned first embodiment. FIG. 4 is a flow chart showing the operation according to the second embodiment of the present invention of the exhaust emission control device 10 for an internal combustion engine shown in FIG. 1. FIG. 5 is a diagram showing the relationship of the stoichiometric conversion time corresponding to the degree of deterioration of the $NO_X$ absorbent 26 for when rich-spiking is carried out in the exhaust emission control device 10 for an internal combustion engine shown in FIG. 1.

Parts the same as for the above-mentioned first embodiment are given the same reference symbols and explanation thereof is either simplified or omitted.

As shown in FIG. 4, firstly when the process for detecting deterioration of the $NO_X$ absorbent 26 commences (Step S11), the air-fuel ratio of the mixture supplied to the internal combustion engine 11 is set to leaner than the stoichiometric air-fuel ratio, and it is judged whether or not lean burn control is being carried out (Step S12). In the case where the result of this judgement is "NO", the processes of Step S16 and thereafter outlined below are carried out.

However, in the case where the result of the judgement is "YES", it is judged whether or not rich-spiking is being carried out (Step S13). In the case where the result of this judgement is "YES" the processes of Step S16 and thereafter are carried out.

On the other hand, in the case where the result of the judgement is "NO", a predetermined time for the engine to run under lean burn control is set based on the operating conditions for the internal combustion engine 11, for example, the output signals from the PBA sensor 17 and the NE sensor 20 (Step S14). This predetermined time is the time taken for the $NO_X$ absorbed by the $NO_X$ absorbent 26 to reach a predetermined level under the various operating conditions of the internal combustion engine 11. It is set, for example, as the time required for the $NO_X$ absorbing agent 26 to absorb $NO_X$ and become saturated. This predetermined time is set shorter the more, for example, the internal combustion engine 11 is operating at a high rotation speed and a high load, and conversely, is set longer the more the engine is operating at a lower rotation speed and lower load. Then it is judged whether or not this predetermined period of time has passed, for example by judging whether or not the $NO_X$ absorbing agent 26 has absorbed $NO_X$ and become saturated (Step S15). In the case where the result of this judgement is "NO", control proceeds to Step S16 where the predetermined time set in Step S14 is reset, and the process then terminated.

However, in the case where the result of this judgement is "YES", two predetermined necessary times (threshold value levels) relating to the stoichiometric conversion time taking into account the operating conditions of the internal combustion engine 11, are set as: the sulfur poisoning stoichiometric conversion time threshold value tm: LMT-S deterioration, for the case where the $NO_X$ absorbent 26 is poisoned by a predetermined amount of sulfur; and the heat deterioration stoichiometric conversion time threshold value tm: LMT heat deterioration, for the case where it is judged that as a result of heat deterioration and the like the $NO_X$ absorbent 26 has deteriorated to the extent that the $NO_X$ absorption capacity has been lost, in other words is in an irreversible deteriorated condition where the $NO_X$ absorption capacity of the $NO_X$ absorbent 26 cannot be recovered (Step 17).

Here, the sulfur poisoning stoichiometric conversion time threshold value tm: LMT-S deterioration is, for example as shown in FIG. 5, the period of time that it takes after the implementation of rich-spiking for the air-fuel ratio of the exhaust gas discharged from the $NO_X$ absorbent 26 which has been poisoned by sulfur to reach the stoichiometric air-fuel ratio or a level just slightly leaner than the stoichiometric air-fuel ratio. This is equivalent to the time taken to carry out desorption of the $NO_X$ from the $NO_X$ absorbent which has been poisoned by sulfur. Also, the heat deterioration stoichiometric conversion time threshold value tm: LMT heat deterioration is, for example as shown in FIG. 5, the time taken for the air-fuel ratio of the exhaust gas discharged from the $NO_X$ absorbent 26 which has deteriorated due to heat deterioration and the like to the extent that the $NO_X$ absorption capacity has been lost, to become to the stoichiometric air-fuel ratio or a level which is just slightly leaner than the stoichiometric air-fuel ratio. This is equivalent to the time taken to carry out desorption of the $NO_X$ from the $NO_X$ absorbent 26 which has deteriorated to an extent that the $NO_X$ absorption capacity has been lost.

Next, as shown in FIG. 4, the measurement of the stoichiometric conversion time is carried out based on the output signals from the second $O_2$ sensor 24 downstream from the $NO_X$ absorbent 26 (Step S18).

Following this, judging is carried out as to whether or not the measurement value of the stoichiometric conversion time has exceeded the predetermined heat deterioration stoichiometric conversion time threshold value tm: LMT heat deterioration (Step S19). In the case where the result of this judgement is "NO" it is judged that the $NO_X$ absorbent 26 has heat deteriorated to the extent that the $NO_X$ absorption capacity has been lost, that is completely (Step S20), and the processing is terminated.

On the other hand, in the case where the result of the judgement is "YES", judging is carried out as to whether or not the measurement value of the stoichiometric conversion time has exceeded the predetermined sulfur poisoning stoichiometric conversion time threshold value tm: LMT-S deterioration (Step S21). In the case where the result of this judgment is "YES", it is judged (Step S22) that the condition is such that there are no problems with the $NO_X$ absorption capacity of the $NO_X$ absorbent 26, for example that after the $NO_X$ absorbent 26 has been used for a travelling distance of 80,000 km its heat deterioration condition is recoverable (normal heat deterioration for 50 K level as shown in FIG. 5), and the series of processes is terminated.

However, in the case where the result of the judgement is "NO", it is judged that while the $NO_X$ absorbent 26 is not in a condition where the $NO_X$ absorption capacity has deteriorated to the extent that it has been lost, poisoning caused by sulfur has progressed so that the $NO_X$ absorption capacity has decreased. A sulfur deterioration regeneration control is thus carried out (Step S23) in order to remove the sulfur compounds absorbed by the $NO_X$ absorbent 26, and thus recover the poisoning. Then the series of the processes is terminated.

For the sulfur deterioration regeneration control, for example, the $NO_X$ absorbent is heated to an appropriate temperature and the air-fuel ratio of the exhaust gas is set to richer than the stoichiometric air-fuel ratio. Then by maintaining this condition for an appropriate period of time the sulfur compounds absorbed by the $NO_X$ absorbent 26 are removed and the poisoning thus remedied.

With respect to the exhaust emission control device 10 for an internal combustion engine according to this embodiment, the sulfur poisoning stoichiometric conversion time threshold value tm: LMT-S deterioration, where it is judged in advance that the $NO_X$ absorbent 26 has deteriorated due to sulphur poisoning to the extent that it is still recoverable; and the heat deterioration stoichiometric conversion time threshold value tm: LMT heat deterioration, where it is judged that due to heating the $NO_X$ absorbent 26 has been irreversibly heat deteriorated to the extent that the $NO_X$ absorption capacity has been lost, are set in relation to the predetermined necessary time relating to the stoichiometric conversion time. As a result at the time of executing rich spiking, by merely judging whether or not the measurement value of the stoichiometric conversion time measured by the output signal from the second $O_2$ sensor 24 downstream from the $NO_X$ absorbent 26, is shorter the sulfur poisoning stoichiometric conversion time threshold value tm: LMT-S deterioration, and whether or not it is longer than the heat deterioration stoichiometric conversion time threshold value tm: LMT heat deterioration, it is possible to judge both easily and accurately whether or not the $NO_X$ absorbent 26 has been sulfur poisoned. Furthermore, by merely determining whether or not the measurement value of the stoichiometric conversion time is shorter than the heat deterioration stoichiometric conversion time threshold value tm: LMT heat deterioration, it is possible to judge both easily and accurately whether or not the $NO_X$ absorbent 26 has deteriorated to the extent that the $NO_X$ adsorption capacity has been lost. Also, it is possible to reliably distinguish whether the $NO_X$ absorbent 26 has heat deteriorated to a non recoverable condition, or is in a temporary sulfur deteriorated condition which is recoverable.

As a result, it is possible to recover sulfur poisoning at an appropriate point in time before the deterioration of the $NO_X$ absorbent 26 caused by sulfur poisoning progresses too far. As well as being able to suppress a lowering in purification efficiency in relation to the exhaust gas, because the implementation of anything more than the minimum processes required to recover the sulfur poisoning is prevented, it is also possible to contribute to the prevention of a worsening in the fuel consumption of the internal combustion engine 11.

Although with the above-mentioned first and second embodiments, a catalyst such as the three-way catalyst (TWC) 25 for catalyzing components such as hydrocarbons, carbon monoxide, $NO_x$ and the like within the exhaust gas in the exhaust gas pipe 22 has been incorporated, the invention is not limited to this and the TWC 25 may be omitted.

What is claimed is:

1. An exhaust emission control device for internal combustion engine having a nitrogen oxide purification means provided in an exhaust system of an internal combustion engine for absorbing nitrogen oxide when an air-fuel ratio of exhaust gas becomes leaner than a stoichiometric air-fuel ratio, and reducing the nitrogen oxide when the air-fuel ratio of exhaust gas becomes richer than the stochiometric air-fuel ratio, comprising:

an oxygen concentration measurement means provided downstream from said nitrogen oxide purification means for measuring oxygen concentration in said exhaust gas;

a time difference measuring means for measuring a time difference for an output signal from said oxygen concentration measurement means to change from lean to rich, when the air fuel ratio of the mixture supplied to said internal combustion engine changes from a condition leaner than the stoichiometric air fuel ratio to a rich air-fuel ratio;

a threshold value setting means for setting, in relation to said time difference, a predetermined first threshold value for judging if a purifying capacity of said nitrogen oxide purification means has deteriorated due to sulfur poisoning, and a predetermined second threshold value shorter than said first threshold value for judging if said nitrogen oxide purification means has heat-deteriorated; and a deterioration judging means for judging that said nitrogen oxide purification means has deteriorated due to sulfur poisoning when a measured time of said time measurement means is shorter than said first threshold value and longer than said second threshold value, and for judging that said nitrogen oxide purification means has heat-deteriorated when said measured time difference of said time difference measuring means is shorter than said second threshold value.

2. An exhaust emission control device for an internal combustion engine according to claim 1, wherein said exhaust emission control device further comprises a sulfur deterioration regeneration means for recovering sulfur poisoning of said nitrogen oxide purification means, when said deterioration judging means judges by comparison of said time difference with said first threshold value that said nitrogen oxide purification means has deteriorated due to sulfur poisoning.

3. An exhaust emission control device for an internal combustion engine according to claim 1, wherein said exhaust emission control device comprises a first oxygen concentration measurement means used for combustion control provided upstream of said nitrogen oxide purification means in addition to said oxygen concentration measurement means provided downstream of said nitrogen oxide purification means.

4. An exhaust emission control device for an internal combustion engine according to claim 1, wherein said exhaust emission control device comprises:

a lean burn control threshold time setting means for setting a threshold value of time in which said internal combustion engine is controlled in a lean burn condition such that said nitrogen oxide purification means absorbs nitrogen oxide; wherein, when a driving time exceeds the threshold time set by said lean burn control threshold time setting means, the air-fuel ratio supplied to said internal combustion engine is changed from the lean burn condition to a rich burn condition in comparison with the stoichiometric air-fuel ratio.

5. An exhaust emission control device for an internal combustion engine according to claim 1, wherein said exhaust emission control device comprises:

a stoichiometric conversion threshold time setting means for setting a threshold time period in which a nitrogen oxide absorbent discharges a nitrogen oxide after rich-spiking, and said stoichiometric conversion threshold time setting means sets a threshold time in response to whether the nitrogen oxide absorbent is sulfur poisoned or heat deteriorated.

* * * * *